Sept. 18, 1928.   G. BÖHM   1,684,693
THRUST BEARING WITH FLUID FRICTION
Filed Aug. 7, 1924
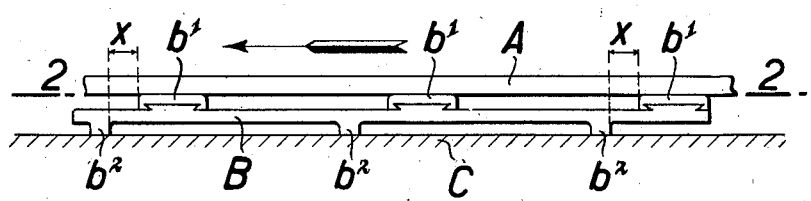
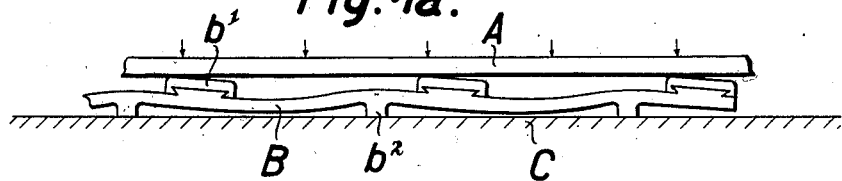
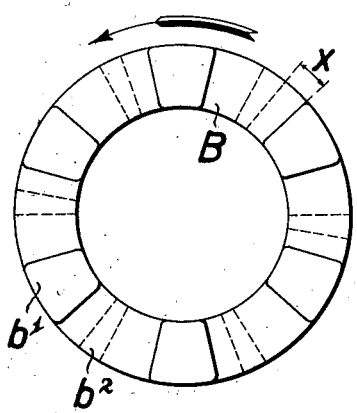
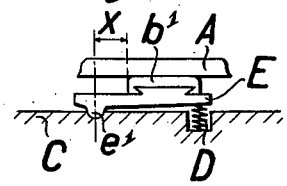
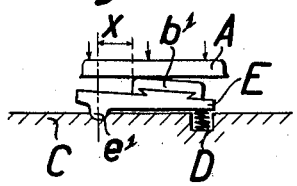
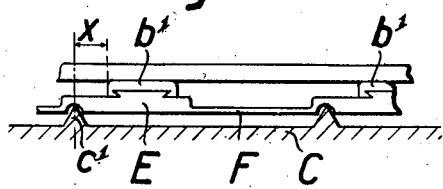
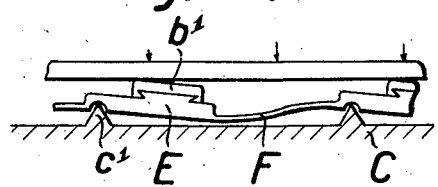
Inventor
Georg Böhm Patented Sept. 18, 1928.

1,684,693

UNITED STATES PATENT OFFICE.

GEORG BÖHM, OF KIEL, GERMANY, ASSIGNOR TO FRIED. KRUPP GERMANIAWERFT AKTIENGESELLSCHAFT, OF KIEL GAARDEN, GERMANY.

THRUST BEARING WITH FLUID FRICTION.

Application filed August 7, 1924, Serial No. 730,705, and in Germany September 10, 1923.

This invention relates to thrust bearings working with fluid friction. With bearings of this kind the fluid friction is produced by subdividing one of the thrust bearing surfaces—mostly that of the bearing—into a plurality of bearing surface segments which are formed and arranged so as to allow them to take by tipping or deflection a slightly inclined position with relation to the cooperating annular bearing surface of the shaft, thereby creating between the thrust bearing surfaces a wedge-shaped space which is filled with the lubricating fluid and which prevents a direct contact of the bearing surfaces.

With all known thrust bearings of the kind stated, the inclining of the said thrust segments or the spacing of the bearing surfaces from each other is effected by the fluid pressure of the lubricating oil itself entering or being sucked in between the bearing surfaces, while when the shaft is at rest the bearing surfaces of the thrust segments bear against the thrust bearing surface of the solid collar of the shaft. As, however, the lubricating oil before exerting its spacing action, has to penetrate between the abutting bearing surfaces by capillary and adhesive action, the inclining of the thrust segments will take place only as the revolutions of the shaft increase, that means gradually. At the same time, the inclining of the thrust segments is rendered difficult, because the frictional force arising at the comparatively large rubbing surfaces which are at first dry and being per se particularly great during the transition of the shaft from rest to movement, produces a moment of force which acts directly opposite to the inclining of the sliding surfaces.

The invention has for its object to provide a thrust bearing of the above-stated kind the thrust ring of which, subdivided into thrust segments, is of such a construction that as soon as the bearing gets loaded, the thrust members will automatically take an inclined position under the action of the load, which for instance with step-bearings means that the thrust members will take their inclined position under the action of the weight of the shaft when same is still at rest.

The accompanying drawing illustrates, by way of example, three embodiments of the subject-matter of the invention.

Fig. 1 is a developed illustration of a step-bearing constructed in accordance with the invention, the bearing being not loaded, Fig. 1ª is a similar elevation of the bearing in loaded condition, Fig. 2 is a section along the line 2—2 of Fig. 1, seen from above in a non-developed illustration, Figs. 3 and 3ª are fragmentary elevations of another embodiment, and Figs. 4 and 4ª are fragmentary elevations of a third embodiment.

The embodiment shown in Figs. 1, 1ª and 2 will be described first.

A designates the thrust collar of the shaft, not shown, which is designed to rotate in the direction indicated by the arrow, while B designates the thrust ring of the bearing which rests on the housing C of the bearing. The thrust bearing ring B (Fig. 2) is constructed as a closed resilient ring; it carries a number (in the present case six) of thrust segments $b^1$ made of white-metal and is supported on the housing C of the bearing by means of radially disposed ribs $b^2$. The arrangement of the thrust segments $b^1$ on the thrust ring B is such that they offset a certain distance $x$ from the supporting surface of the ribs $b^2$. If the bearing is loaded in its condition of rest or working (as indicated in Fig. 1ª by arrows), the resilient ring B bends in the manner to be seen in Fig. 1ª and the thrust segments $b^1$ take an inclined position with relation to the thrust collar A, this position being intentionally shown in the said figure in a somewhat exaggerated way. As the inclined position of the thrust segments, on the one hand, depends on the magnitude of the distance $x$, and, on the other hand, on the degree of deflection of the resilient ring B, a suitable dimensioning and shaping of the resilient ring and a corresponding selection of the distance $x$ allows of attaining the proper inclined position of the thrust segments for the intended medium number of revolutions and load of any bearing. If the bearing ring B is divided for purposes of an easy insertion and removal, it may, under certain circumstances be advisable to construct the end of such a ring section as a resilient overhanging girder as shown at the right-hand end of Figs. 1 and 1ª. At this end there is also a distance $x$ between the corresponding thrust segment $b^1$ and its neighbouring supporting rib $b^2$ so that, by suitably shaping the overhanging resilient end of the sectional ring and properly choosing the distance $x$, it may be attained that the thrust segment carried by the overhanging end will position itself at an incline in exactly the same manner as the other thrust segments $b^1$ which rest on two supports.

Figs. 3 and 3ª show the invention as applied to a bearing with which the thrust segments $b^1$ are arranged on individual tiltable thrust members E which are adapted to be tipped into an inclined position on radially disposed tilting edges $e^1$ contrary to the action of a spring D. In this case, the thrust segment $b^1$ is likewise situated at a certain distance $x$ from the tilting edge $e^1$, so that immediately upon the loading of the bearing commencing as shown in Fig. 3ª, there will again take place an inclining of the thrust segments $b^1$ with relation to the surface of the thrust collar A of the shaft.

According to the embodiment illustrated by Figs. 4 and 4ª, the several thrust segments $b^1$ are arranged on thrust members E which are united into an elastic ring by means of thin and resilient intermediate lamels F. Every single thrust member rests by a radial recess $e^1$ on a radially disposed tilting edge $c^1$ of the housing C of the bearing. In this case, there is also a distance $x$ between the thrust segments $b^1$ and the tilting edge $c^1$, so that also with this embodiment every load, including the dead load, on the bearing will cause the thrust segments to be inclined (see Fig. 4ª).

In contradistinction to the well-known bearings of the kind in question, it is in all cases attained by the described arrangement that the thrust segments $b^1$ automatically take the proper inclined position with relation to the cooperating bearing surface of the shaft collar independently of the pressure of the lubricating oil as soon as any pressure is exerted on the bearing, so that the necessary wedge-shaped space for the reception of the lubricating oil between the thrust segments $b^1$ and the thrust collar A of the shaft will be immediately produced in an automatic way. With such a bearing the lubricating oil may therefore enter quickly and unhinderedly between the relative rubbing surfaces of the bearing members.

The described bearings therefore possess a double advantage; on the one hand, the oil film separating the bearing surfaces during the working and producing the fluid friction is not formed only gradually but instantaneously upon the beginning of a loading of the bearing and, on the other hand, there is securely avoided a sliding of large dry rubbing surfaces on one another during the transition of the shaft from rest to movement, this being unavoidable with the bearings known hitherto.

Claims.

1. A thrust bearing comprising a plurality of annularly spaced bearing segments, and a tiltable support for each segment non-tiltably secured thereto and having its axis annularly offset from the segment.

2. A thrust bearing comprising a plurality of annularly spaced bearing segments, an annularly extending bridge member non-tiltably secured to each segment, a pivotal support for each bridge member annularly offset from the corresponding segment on one side thereof, and means for yieldingly supporting each bridge member on the other side of the segment.

3. A thrust bearing, one of the bearing members of which consists of a thrust collar having a continuous bearing surface and the other of a resilient thrust ring having its bearing surface subdivided into a plurality of bearing segments non-tiltably secured to said thrust ring, radial ribs supporting said thrust ring at points offset from said segments, said rigs being so positioned with reference to the segments that end thrust on the bearing causes the segment-supporting sections of the thrust ring to tilt on the ribs on one side of the segments respectively while the thrust ring flexes between the segments and the ribs on the other side of the segments respectively.

4. A thrust bearing comprising a bearing member formed as a thrust collar on a shaft and another bearing member formed as a resilient ring resting on radial supporting ribs and having its bearing surface subdivided into a plurality of bearing segments non-tiltably secured to said ring, the said ribs being offset relatively to said segments, said resilient ring comprising segment-supporting overhanging girder sections and resilient connecting sections.

5. A thrust bearing in which one of the bearing members consists of a plurality of thrust segments each non-tiltably secured to a yieldable member pivotally supported at a point offset with respect to the segment.

6. A thrust bearing for rotary members comprising a plurality of separate plates, each of said plates being supported at its ends and having a clearance beneath the plate between the points of support and each of said plates being tapered lengthwise of itself and circumferentially of the bearing throughout at least a portion of its length and each plate having a projecting friction pad between its ends adapted to abut the rotary member.

7. A thrust bearing comprising an arcuate bearing plate, a supporting surface, means to space the plate away from said surface at a plurality of points, the plate between said points being of varying thickness lengthwise of the plate and circumferentially of the bearing, and a bearing pad on said plate between each two of said points for causing deflection of the plate between said points.

8. A bearing comprising a moving member, a plurality of bearing elements each of which comprises a bearing shoe which in itself is rigid and non-yielding, and yielding members between which said shoe is located, said members in conjunction serving to support the shoe at two points to provide a clearance beneath the shoe between the points of support, the supporting member at the forward end of the shoe being adapted to yield prior to the other supporting member for a given load to inaugurate a wedge shaped pocket between the surface of the shoe and the surface of the moving member and both supporting members being adapted to yield for higher loads whereby said wedge shaped space is maintained.

9. A bearing comprising a moving member, a plurality of bearing elements each of which comprises a bearing shoe which in itself is rigid and non-yielding, and yielding members between which said shoe is located, said members in conjunction serving to support the shoe between the points of support, both of said supporting members being adapted to yield under the action of the load but the supporting member at the forward end of the shoe being adapted to yield more than the other supporting member for any given load whereby a wedge shaped space is formed and maintained between the surface of the shoe and the surface of the moving member for all loads.

10. A bearing in accordance with claim 8 in which the yielding members are in the form of legs associated with the bearing elements.

11. A bearing in accordance with claim 9 in which the yielding members are in the form of legs associated with the bearing elements.

The foregoing specification signed at Hamburg, Germany, this 11th day of July 1924.

GEORG BÖHM.